March 21, 1967 J. B. GILL 3,309,749

CHAIN COLLAR

Filed Nov. 19, 1965

INVENTOR.
JOHN B. GILL
BY Schapps & Hatch
ATTORNEYS

United States Patent Office 3,309,749
Patented Mar. 21, 1967

3,309,749
CHAIN COLLAR
John B. Gill, 20433 Earl St., Torrance, Calif. 90503
Filed Nov. 19, 1965, Ser. No. 508,753
3 Claims. (Cl. 24—249)

This invention relates to improvements in a chain collar and more particularly to devices adapted to be secured to and placed in encircling relation around a cylindrical object, such as a pipe, in order to limit axial displacement therealong of members such as couplings, fittings, levers and the like.

It is often desirable to provide means for limiting movement of members such as couplings onto the end of a pipe. For example, in the asbestos-cement pipe art, couplings and fittings are pushed onto the ends of straight pipe sections. The ends of the pipe sections are turned or machined to afford a precise configuration and usually provide a shoulder which limits the movement of the coupling onto the pipe. However, certain types of couplings are used with pipe ends which do not provide such limiting shoulders and it becomes desirable, if not necessary, to provide some means of limiting the displacement of the coupling along the pipe.

It is also often desirable to provide a temporary anchor means along a pipe for giving purchase to a coupling puller. Such coupling pullers use a chain attached to a coupling and to a lever at a point between the applied force and the fulcrum. The fulcrum is fixed to the pipe so that operation of the lever transmits force through the chain to the coupling to draw the coupling onto the pipe. The chain collar of the present invention can provide the fixed point on the pipe for the fulcrum in this arrangement.

Limiting devices in the form of flexible steel bands have previously been used. However, the use of such bands is not advantageous in certain respects. The user is forced to maintain an assortment of bands to accommodate the various pipe sizes encountered. Also, the bands are made of relatively thin material to provide the necessary flexibility, and because of this they do not offer a suitable structure for engagement by the lever of a coupling puller. Furthermore, the frictional engagement of the bands with the pipe surface is inadequate for purposes such as serving as anchors for a coupling puller or the like because of the high order of axial forces imposed in such use.

Good frictional engagement of the collar with the pipe is vital, as the function of the collar is to prevent axial movement of objects along the pipe. To do so, the collar must grip the pipe in an efficient manner, generating sufficient resistance to displacement from a minimum of circumferential tension in the collar in order to avoid crushing the pipe. It is important that the force applied to the pipe by the collar be distributed evenly over the greatest practicable amount of the circumference of the pipe, especially when the collar is to be applied to relatively fragile material such as asbestos-cement pipe. Unduly large forces, especially if unevenly distributed around the pipe, may cause distortion or even crushing of such pipes.

Accordingly, it is a principal object of the present invention to provide a detachable collar for attachment to a pipe to prevent axial movement of objects along the pipe.

It is a further principal object of the present invention to provide a chain collar of unitary construction which is readily adaptable to a wide range of pipe sizes so that it is not necessary to have a different collar for each size of pipe.

Another object of the present invention is to provide a detachable chain collar which can be cinched taut around a pipe and which distributes the cinching force evenly about the circumference of the pipe to prevent injury to relatively fragile pipes such as asbestos-cement pipe.

A further object of the present invention is to provide a chain collar which contacts the pipe surface in a manner which maximizes frictional engagement therewith in order to maximize resistance of the collar to displacement along the pipe.

A still further object of the present invention is to provide a chain collar which may be quickly and easily applied to and removed from various sizes of pipe, and which is of simple, economical and durable construction to withstand rough use in the field.

Further objects and advantages of my invention will become apparent as the specification proceeds, and the new and useful features of my invention will be fully defined in the claims attached hereto.

The preferred form of my invention is illustrated in the accompanying drawings forming a part of this specification, in which.

Figure 4:
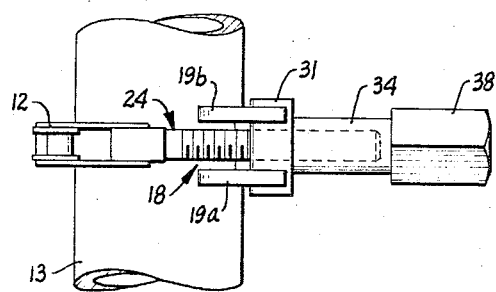
FIGURE 4 is a top view of the chain collar applied to a small diameter pipe as in FIGURE 1.

While I have shown only the preferred form of my invention, it should be understood that various changes or modifications may be made within the scope of the claims attached hereto without departing from the spirit of the invention.

Referring to the drawings in detail, it will be seen that the chain collar of the present invention basically comprises an assembly 11 having a length of roller chain 12 formed for securing in encircling relation about a pipe 13, a connector unit 14 selectively engageable with individual links of roller chain 12 to form a pipe-encircling loop conforming to the size of the pipe 13, and tightening means 16 interposed in assembly 11 and formed for pulling the loop taut in binding relation around pipe 13.

The chain 12 is here shown as being a length of standard double pitch roller chain long enough to encircle the largest pipe with which the collar is to be used. Chain 12 is secured at one end to tightening means 16, and is adapted to the size of the pipe by wrapping one turn of chain around the pipe 13 and fitting the closest link of the chain 12 onto a hook portion 17 of connector unit 14. Excess chain is allowed to drape out of the way. Tightening means 16 is effective to take up the remaining slack in chain 12 to bind the entire assembly 11 tightly about pipe 13.

Figure 3:
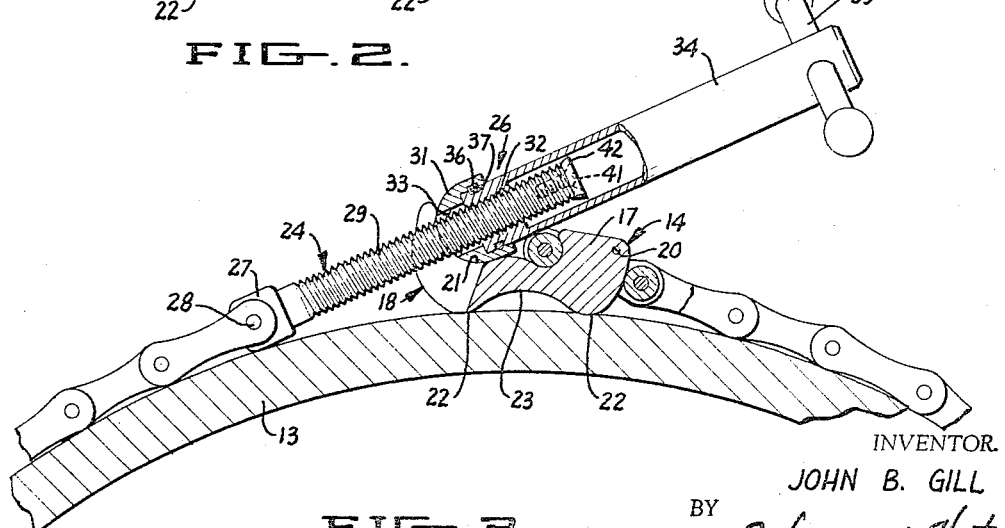
FIGURE 3 is a side view in partial cross-section of the chain collar of the present invention mounted on a large diameter pipe, showing an alternate form of the handle of the device.

Connector unit 14 preferably is formed as a double hook of roughly W-shaped configuration, with one end formed into a longitudinally thick flattened single-pronged hook portion 17, and the other end formed with parallel spaced curved prongs 19a and 19b defining a bifurcated hook 18. Single pronged hook 17 is dimensioned in thickness and width to occupy substantially all of the space between adjacent rollers and link plates of a link of roller chain 12, and is provided with a hole 20 for receiving a pin such as a cotter key for retaining the connector unit on chain 12. The thick configuration of hook 17 serves to withstand the stresses imposed on connector unit 14 over a wide range of angles of the engaged link of chain 12 with respect to the connector unit 14, and also allows location of hole 20 at a spot where a pin therethrough is clear of the chain when the chain is taut, even on large pipes (see FIGURE 3).

The spaced parallel prongs 19a and 19b of hook 18 are spaced laterally by a distance sufficient to accommodate a threaded shank 29 of a bolt assembly 24 between them, and their inner surfaces 21 are formed for load-bearing engagement with the tightening means 16 through a wide range of angles.

The lower surface of connector unit 14 is here formed with spaced lobes 22, for contacting pipe 13, and a concave relieved area 23 between lobes 22. The radius of curvature of relieved area 23 is shorter than the radius of the smallest pipe on which the collar is used, so that the connector unit always contacts the pipe surface at two circumferentially spaced locations. This configuration results in more even transmission of stress to pipe 13 and increases frictional engagement of the connector unit 14 with the surface of pipe 13.

The tightening means 16 here consists of a bolt assembly 24 threadably engaged with a nut assembly 26. Bolt assembly 24 is formed with an enlarged head portion 27, of the same width as the space between link plates of chain 12, and a threaded shank 29 extending into nut assembly 26. Head portion 27 is secured to the terminal link of chain 12 in place of the last roller thereof by a pin 28. The nut assembly 26 includes a half-round latch 31 of a curvature conforming to the inner surfaces 21 of hook 18 and having a width sufficient to extend across both of prongs 19 and has an aperture 33 therethrough dimensioned to pass shank 29 freely. A nut 32 mates with shank 29 and bears on latch 31, and a hollow handle member 34, of internal diameter slightly greater than shank 29, is attached to and extends from nut 32. Nut 32 is of sufficient axial length for its threads to bear the stresses imposed thereon, and the remaining length of nut assembly 26 is made hollow to ease operation by reducing friction. With this structure the threads of nut 32 are shielded from debris.

Figure 1:
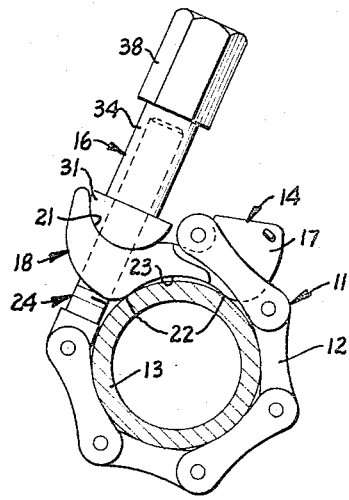
FIGURE 1 is a side view of a chain collar constructed in accordance with the present invention and mounted on a small diameter pipe, showing one form of the handle of the device.
Figure 2:
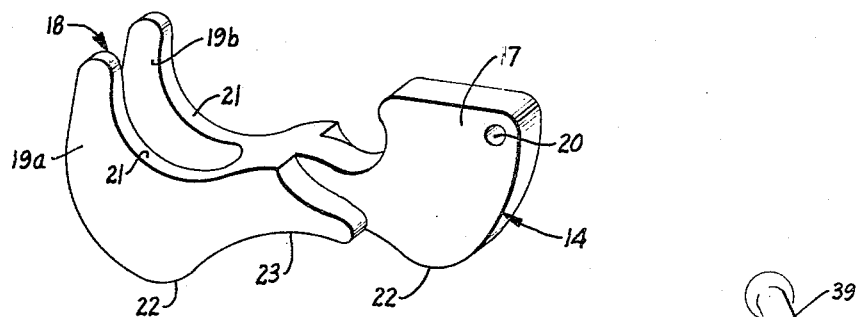
FIGURE 2 is an enlarged perspective view of the coupling used in the present invention.

In the form of the invention shown in FIGURE 1, latch 31 is not attached to nut 32 and is free to move axially along shank 29. In the form shown in FIGURE 3, latch 31 is retained on nut 32 by means of pins 36 which engage an annular groove 37 in nut 32, so that nut 32 may rotate with respect to latch 31, but latch 31 may not move axially independently of nut 32. In the form shown in FIGURE 1, handle member 34 is terminated by a polygonal head 38 for engagement by wrench-type tools, while in the form shown in FIGURE 3, handle member 34 is terminated by a conventional sliding-bar T-type handle 39 for hand operation.

In both forms, the distal end of shank 29 preferably is drilled and tapped for a screw 41 which attaches a washer 42 to the end of shank 29. The washer 42 is of a diameter greater than shank 29 and less than the internal diameter of handle member 34 to serve as a retainer against separation of shank 29 from nut 32.

The shape of connector unit 14, its location at the surface of the pipe rather than radially outwardly therefrom, and the mode of attachment of tightening means 16 to chain 12 coact with each other to dispose tightening means 16 with shank 29 generally tangent to the pipe 13. This configuration brings about a maximum of chain contact with the pipe, together with a desirable symmetry of distribution of the forces applied by tightening means 16. Maximizing chain contact with the pipe increases the resistance of the collar to displacement, as each link of chain 12 in contact with pipe 13 contributes to the grip of the collar on the pipe.

It should be appreciated that many types of chain may be suitable for use in my chain collar, but I have found standard double pitch roller chain to offer a desirable degree of "bite" into the pipe surface, coupled with distribution of stress over a sufficient area of the pipe such that damage to pipes of relatively fragile material is avoided. Other pipe handling or forming tools may be affixed to a pipe by the chain collar of the present invention, simply by replacing one or more links of chain 12 with the tool or tools to be attached to the pipe.

From the foregoing, it will be seen that I have provided a novel detachable chain collar for attachment to a pipe to prevent axial displacement of objects therealong, which is readily adaptable to a wide range of pipe sizes. My novel chain collar distributes stresses evenly around the pipe circumference and maximizes frictional engagement of the collar with the pipe, so that large forces may be applied to relatively fragile pipes without injury thereto.

I claim:
1. A chain collar for a pipe, comprising a length of roller chain adapted for encircling a pipe, an elongated rod having an end secured to an end of said roller chain, a sleeve formed for receiving the other end of said rod in telescoping relation and having a threaded connection thereto whereby relative rotation of said sleeve on said rod will displace said rod axially into and out of said sleeve, a latch member journaled on the end of said sleeve confronting the end of said rod to which said chain is secured, and a connector unit having a bifurcated hook portion formed for releasably hooking over said latch member astride said rod and an opposed hook portion formed for releasably hooking into said chain at any desired location.

2. A chain collar as described in claim 1 and wherein said connector unit has a lower surface formed with spaced lobes separated by a relieved area to accommodate the curved surface of the pipe and provide increased frictional engagement between said connector unit and the pipe surface, said relieved area being of curved configuration having a radius of curvature smaller than the radius of the smallest pipe to be accommodated by the chain collar so that the connector unit will contact the outer surface of the pipe in at least two places.

3. A chain collar as described in claim 1 and wherein said opposed hook portion is dimensioned to snap into and occupy substantially all of the space defined by adjacent rollers and their connecting links of said roller chain when said opposed hook portion is releasably hooked into said chain.

References Cited by the Examiner

UNITED STATES PATENTS

| 830,110 | 9/1906 | Spencer. | |
|---|---|---|---|
| 1,130,863 | 3/1915 | Wallace | 81—65 |
| 2,489,535 | 11/1949 | Montague | 24—281 |
| 2,644,713 | 7/1953 | Failing | 81—65 X |
| 3,213,529 | 10/1965 | Gill | 29—237 |

FOREIGN PATENTS 1,017,676    9/1952    France.

WILLIAM FELDMAN, *Primary Examiner.*

DONALD A. GRIFFIN, *Examiner.*